United States Patent

Wischermann

[11] Patent Number: 5,886,751
[45] Date of Patent: Mar. 23, 1999

[54] METHOD OF ELIMINATING INTERFERENCE SIGNALS FROM VIDEO SIGNALS

[75] Inventor: Gerhard Wischermann, Weiterstadt, Germany

[73] Assignee: U.S. Philips Corporation, New York, N.Y.

[21] Appl. No.: 807,975

[22] Filed: Mar. 3, 1997

[30] Foreign Application Priority Data

Mar. 9, 1996 [DE] Germany ................. 196 09 197.7

[51] Int. Cl.[6] ............................. H04N 5/213; H04N 5/21
[52] U.S. Cl. .................... 348/620; 348/607; 348/618; 348/619
[58] Field of Search ................... 348/607, 618, 348/619, 620, 622, 623, 700, 701, 442; H04N 213/21

[56] References Cited

U.S. PATENT DOCUMENTS

| | | | |
|---|---|---|---|
| 4,485,403 | 11/1984 | Illetschko | 358/167 |
| 4,502,106 | 2/1985 | Glennon | 363/56 |
| 4,609,983 | 9/1986 | Braun | 363/98 |
| 4,788,493 | 11/1988 | Liptak | 324/140 R |
| 5,404,178 | 4/1995 | Kondo et al. | 348/618 |
| 5,412,436 | 5/1995 | Christopher | 348/701 |
| 5,519,453 | 5/1996 | Wischermann | 348/620 |

FOREIGN PATENT DOCUMENTS

| | | | |
|---|---|---|---|
| 4137404 | 11/1991 | Germany . | |
| 4319342 | 6/1993 | Germany . | |
| 4319343 | 6/1993 | Germany . | |
| 4326390 | 8/1993 | Germany . | |
| 4343095 | 12/1993 | Germany . | |
| 43 26 390 A1 | 2/1995 | Germany | H04N 5/21 |

*Primary Examiner*—John K. Peng
*Assistant Examiner*—Wesner Sajous
*Attorney, Agent, or Firm*—Edward W. Goodman

[57] ABSTRACT

Method of eliminating interference signals from video signals by means of motion-adaptive transversal filtering, in which the motion is detected in the two-dimensional plane for the purpose of S/N ratio improvement. To this end, the forward and backward-motion signals are combined to a common motion signal and transformed into a polar coordinate signal from which the coefficients for controlling the transversal filter are derived.

19 Claims, 6 Drawing Sheets

METHOD OF ELIMINATING INTERFERENCE SIGNALS FROM VIDEO SIGNALS

BACKGROUND OF THE INVENTION

1. Field of the Invention

The invention relates to a method of eliminating interference signals from video signals by means of motion-adaptive filtering with a second or higher-order transversal filter which is controlled by a motion detector.

2. Description of the Related Art

A method of eliminating interference signals from video signals by means of motion-adaptive filtering with a second-order transversal filter is known from DE 43 26 390 corresponding to U.S. Pat No. 5,519,453. In this method, video signals are derived from three consecutive pictures and, after evaluation with coefficients, added together. The coefficients are generated by a forward and a backward-motion detector. When there is no motion or only very little motion—the distinctions between the derived video signals are smaller than a given predetermined threshold value—, a maximum improvement of the signal-to-noise ratio of 4.8 dB can be achieved. In this case, the output signal is the arithmetic mean value of the three pictures. In the case of considerable motion, large amplitude differences between the three pictures generally occur. To avoid "smear" of the different motion phases, there should be a fading to the reference picture, i.e., the middle picture. To this end, the coefficients of the other pictures are controlled towards 0 and the coefficient of the reference picture is controlled towards 1.

A possible circuit arrangement for a motion detector is described in DE 43 19 342 A1, corresponding to U.S. Pat. No. 5,543,858. It comprises a forward-motion detector which, on the basis of the reference picture, evaluates the difference with the subsequent picture. An identically built backward-motion detector, which evaluates the difference with the preceding picture in a corresponding way, can then be added for a multidimensional motion detection. In this case, the amounts of the differences of two consecutive pictures are formed and submitted to a low-pass filtering operation so as to suppress high-frequency noise components. The low-pass filters may be implemented as two-dimensional (horizontal and vertical) transversal or median filters. To avoid response of the detectors at only a slight motion or at residual noise components, the signals are applied in accordance with an adjustable threshold characteristic. Subsequently, the coefficients are generated in a programmable read-only memory (PROM) in accordance with a declining characteristic. This characteristic starts at ⅓ for the static case (no motion or only little motion) and then decreases to zero with, for example, an exponential characteristic.

When the motion detectors were tested on improving the elimination of interference signals from video signals, it was found that a maximum interference signal reduction is achieved when the two motion detectors do not respond, i.e., at stationary pictures at which the S/N ratio improvement is 4.8 dB. An average interference signal reduction is achieved when only one of the motion detectors responds, with an S/N ratio improvement of 2.5 dB being achieved by evaluating the video signals with ⅔ for the reference picture signal and ⅓ for the signal of the stationary picture. If both motion detectors respond, no interference signal reduction is possible, i.e., the S/N ratio gain is 0 dB. This makes it clear that the original motion detector actually only allows S/N ratio improvement in a few cases only. An optimum filtering is not even reached once for the simple case where only one motion detector responds, because an optimum filtering operation with coefficients of ½ each for the reference picture signal and the signal of the stationary picture should then be used. This means that both pictures, between which there is no motion, should be averaged by 50% each, which would lead to an S/N ratio improvement of 3 dB. The reason for this detrimental behavior is that the mode of operation of one motion detector does not have any effect on that of the other.

SUMMARY OF THE INVENTION

It is therefore an object of the invention to provide a circuit arrangement of the type described in the opening paragraph, in which the motion in the two-dimensional plane is detected for the purpose of improving the signal-to-noise ratio.

This object is solved in that the multidimensional motion detector, consisting of a forward-motion and a backward-motion detector, combines the generated forward-motion and backward-motion signals to one common motion signal, and in that the coefficients for controlling the transversal filtering operation are derived from this common motion signal.

The circuit arrangement according to the invention has the advantage that a suppression of interference signals is possible in all ranges of the two-dimensional plane.

These and other aspects of the invention will be apparent from and elucidated with reference to the embodiments described hereinafter.

BRIEF DESCRIPTION OF THE DRAWINGS

In the drawings:

FIG. 5a is a block diagram of the hysteresis device, while

DESCRIPTION OF THE PREFERRED EMBODIMENTS

Figure 1:
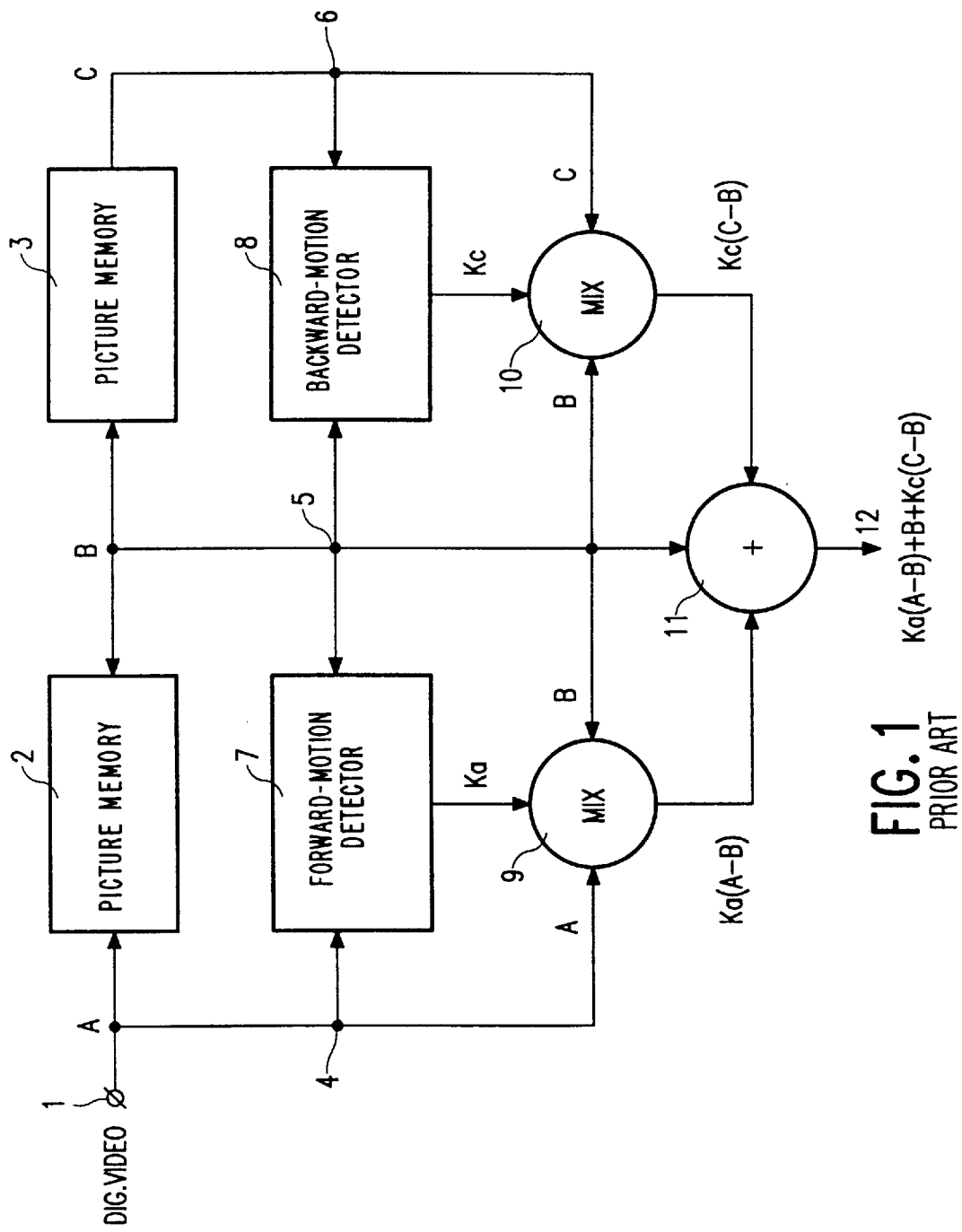
FIG. 1 is a block diagram of a known adaptive transversal filter.

The motion-adaptive second-order transversal filter of the prior art, shown in FIG. 1, receives the (digital) video signals to be filtered via terminal 1 and delayed by one picture period in two picture memories 2 and 3, so that the signals of three consecutive pictures A, B and C are simultaneously available at points 4, 5, 6. The video signals of the pictures A and B are applied to a forward-motion detector 7 for generating the coefficient Ka, and the video signals of the pictures B and C are applied to a backward-motion detector 8 for generating the coefficient Kc. Moreover, said video signals are simultaneously applied to a mixer stages 9, 10, respectively, conveying, at their control inputs, the coefficients Ka and Kc, respectively, so that a signal Ka(A−B) can be derived at the output of the mixer stage 9 and a signal Kc(C−B) can be derived at the output of mixer stage 10. These two output signals are now applied to an adder stage 11, while the video signal of the picture B is present at the third input of this adder stage. An output signal Ka(A−B)+B+Kc(C−B) can thus be derived at the output of the adder stage 11.

As already explained above, the coefficients Ka and Kc generated by the detectors 7 and 8 control the mixer stages 9 and 10 in such a way that, in the case of little motion in the pictures, the output signal at the stage 11 represents the arithmetic mean value of the three pictures A, B and C and thus the maximum S/N ratio improvement of 4.8 dB is achieved. At a stronger motion in the pictures A, B and C, the coefficients Ka and Kc are controlled towards 0 so that the video signal of the reference picture B can be derived at the output. The S/N ratio gain would then be 0 dB. If only one of the detectors 7 or 8 responds, so that either Ka or Kc is controlled to 0, an S/N ratio gain of 2.5 dB is achieved because the other video signal is evaluated with ⅓ and the reference picture signal is evaluated with ⅔.

Figure 2:
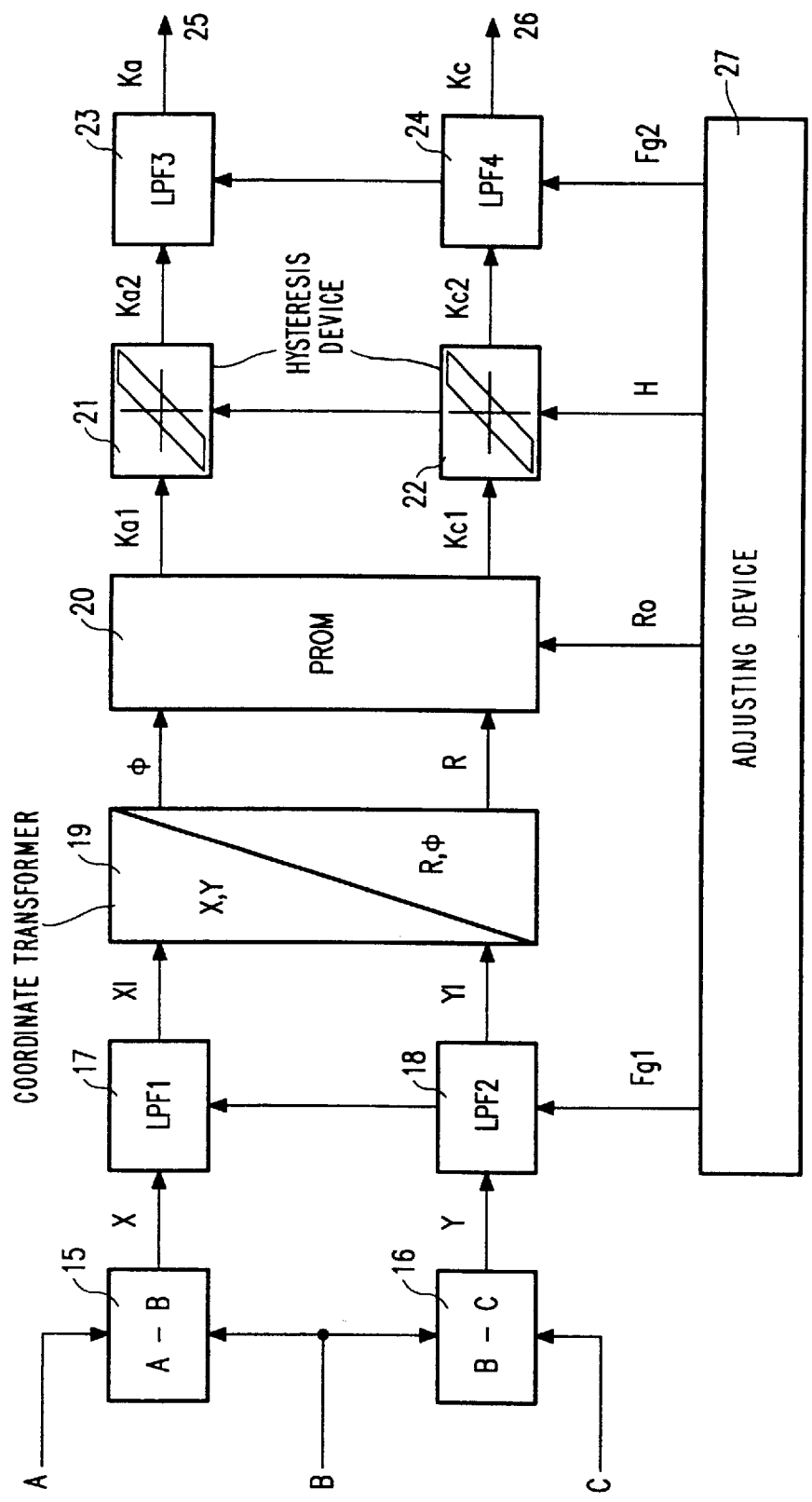
FIG. 2 is a block diagram of a two-dimensional motion detector according to the invention.

To improve the S/N ratio, a two-dimensional motion detector for generating the coefficients Ka and Kc is used, which detector is shown in FIG. 2. The inputs of the motion detector convey the video signals of the pictures A, B and C and are applied to two differential stages 15 and 16. The picture-to-picture difference signals X and Y can be derived at the outputs of the stages 15 and 16. These signals X and Y are initially (optionally) submitted to a horizontal and vertical low-pass filtering operation so as to suppress high-frequency noise components. The output signals XL and YL of the filters 17 and 18 are then applied to a coordinate transformation device 19 for converting the signals, present in cartesian coordinates, into polar coordinate signals Φ and R. In a subsequent, programmable read-only memory (PROM) 20, the coefficients Ka1 and Kc1 are stored in a table which is controlled by means of the angle signal Φ and the radius signal R. The signals Ka1 and Kc1 supplied by the memory 20 are constant below a limit radius R0 and do not depend on the angle, whereas they are only dependent on the angle above a limit radius R0.

The output signals Ka1 and Kc1 are now not directly used for coefficient control of the transversal filter but initially supplied through hysteresis devices 21 and 22 which will be further described with reference to FIG. 5a and 5b. The output signals Ka2 and Kc2 of the hysteresis devices 21 and 22 are supplied via further horizontal and vertical low-pass filters 23 and 24, respectively, so as to suppress residual noise components in the motion detector. The coefficients Ka and Kc, provided for controlling the transversal filter, can then be derived at the outputs 25 and 26 of the filters 23 and 24. With a view to an optimum suppression of interference signals, the limit frequencies of the low-pass filters 17 and 18, and 23 and 24, and also the value of the hysteresis H and the limit radius R0 should be externally readjusted proportionally to the S/N ratio of the input signal. This is possible by means of the adjusting device 27 controlled either manually by the user or by means of an automatic measurement of the fundamental noise in the video signal, as described in DE 41 27 404 A1 or DE 43 19 343 A1, corresponding to U.S. Pat. Nos. 5,612,752 and 5,485,222, respectively.

Figure 3:
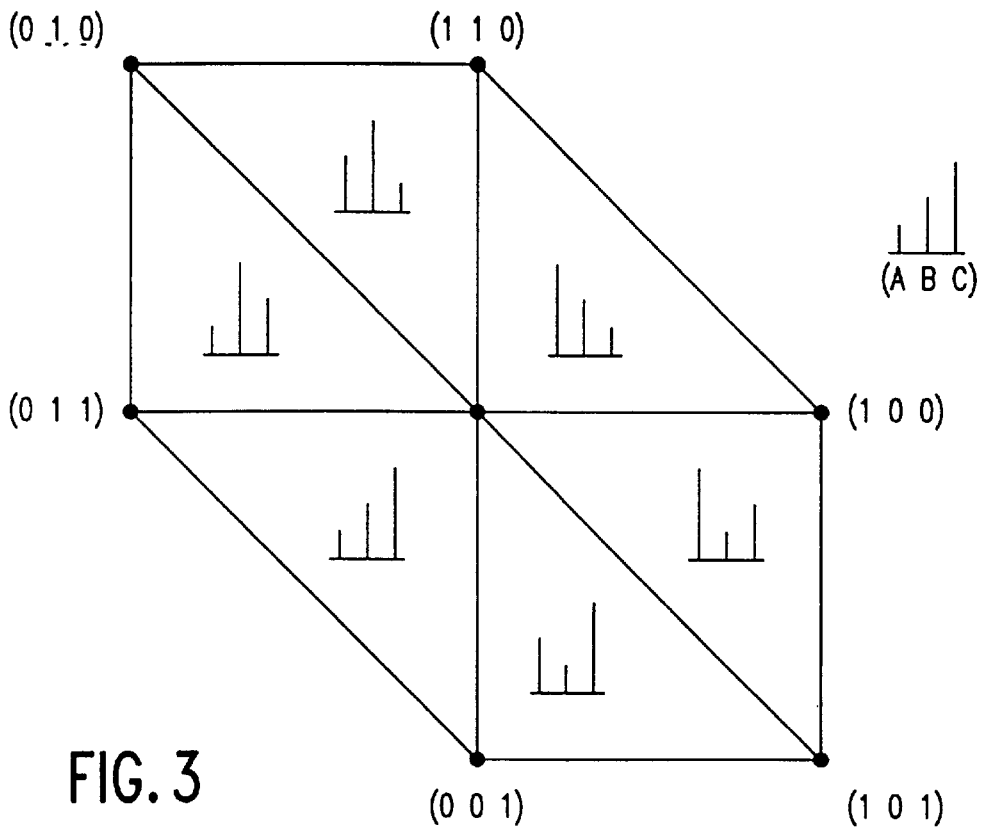
FIG. 3 is a diagram showing six sectors in the motion plane of a cartesian system of coordinates.

The X/Y motion plane shown in FIG. 3 is divided into six sectors. The dimensional ratios of the pictures A, B and C are shown graphically by means of the lines shown in the sectors. The hexagon in the X/Y plane is bounded by the 0–1 combinations of A, B and C. In the coordinate origin, all stationary pixels are shown with the property A=B=C. The two corners (A B C)=(0 1 0) and (A B C)=(1 0 1) characterize the −45° diagonals in the X/Y plane with the property that the pictures A and C have identical amplitudes but are greatly different from the reference picture B. This is the straight line on which static disturbances such as film dust and film dirt are imaged, for example, in the case of stationary pictures. Along this straight line and in its vicinity, a noise reduction by averaging A, B and C is apparently impossible because the reference picture B does not have any correlation with the preceding or the subsequent picture. A method of recognizing film dust and film dirt is described in DE 43 43 095 A1, corresponding to U.S. patent application Ser. No. 08/356,948, filed Dec. 15, 1994.

The +45° diagonals (not explicitly shown in the Figure) exactly indicates the opposite property. The amplitude of the reference picture B is in the middle of A and C, for example (A B C)=(0 ½ 1). Here, the arithmetic averaging of A, B and C exactly yields the amplitude of B=½ and this with an S/N ratio gain of 4.8 dB. It seems to be plausible that an S/N ratio improvement between 3 and 4.8 dB is possible by suitable choice of the coefficients Ka, Kb and Kc in the joint first and third quadrants of the X/Y plane.

Figure 4:
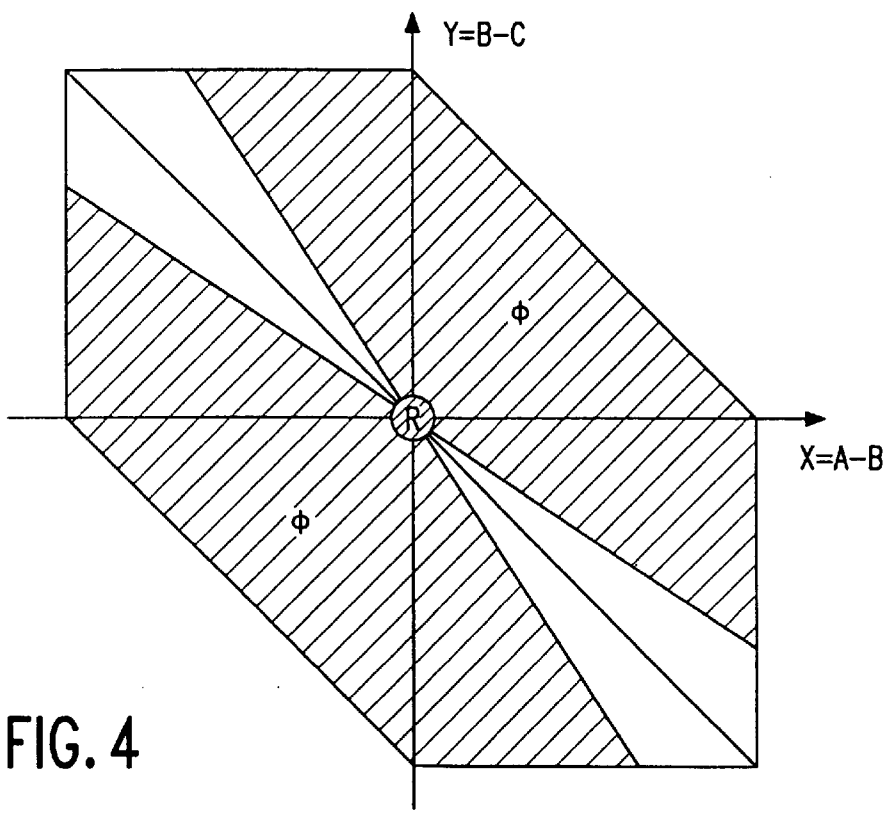
FIG. 4 shows the interference signal reduction ranges of the circuit arrangement according to the invention in the cartesian system of coordinates.

However, FIG. 4 shows that not only the complete first and third quadrants but also predominant parts of the other four sectors can be utilized for the noise reduction. The interference signal reduction ranges are shown in the X/Y plane in FIG. 4. In the surroundings of the origin (range R), the constant set of coefficients of ⅓-⅓-⅓ should be valid up to a limit radius R0. In the ranges denoted by Φ, the following coefficient equations derived from the transformation equations X=R*COS Φ and Y=R*SIN Φ hold for Ka, Kb and Kc:

$$Kb = 1/(2 + SIN2\Phi)$$
$$Ka = 0.5 * (1 + SIN2\Phi - COS2\Phi)/(2 + SIN2\Phi)$$
$$Kc = 0.5 * (1 + SIN2\Phi + COS2\Phi)/(2 + SIN2\Phi)$$

Pulse-like interferences are shown in the two white sectors. In accordance with DE 43 43 095 A1, these interferences can be eliminated by median filtering of A, B and C. Alternatively, the same result can be achieved with a transversal filter in this range by means of filtering with a the set of coefficients ½-0-½.

Figure 5A:
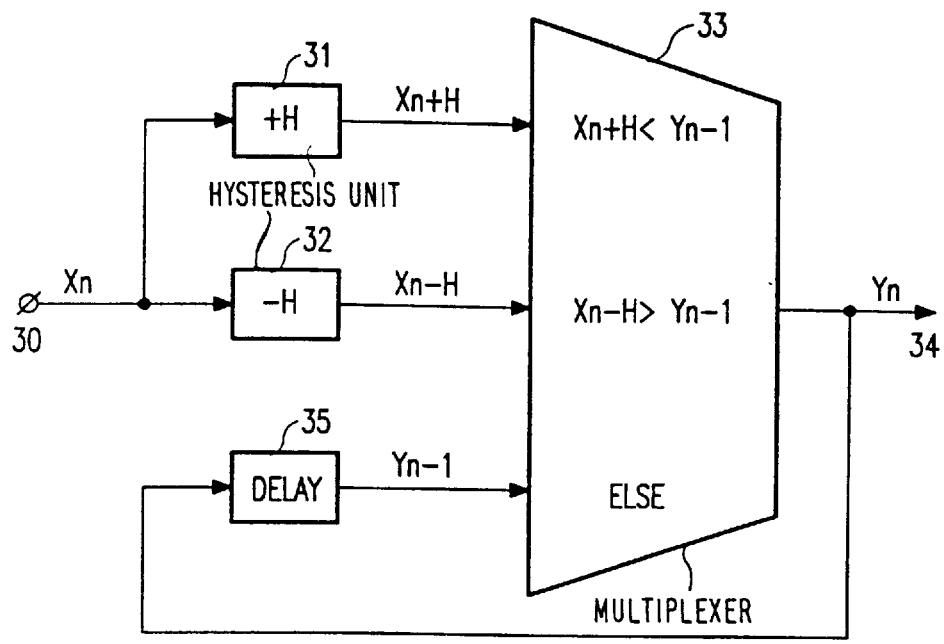

FIG. 5a shows a device for digitally realizing a hysteresis. For example, a signal Xn is present at the input 30, which signal is applied to two hysteresis units 31 and 32 which have their outputs coupled to a multiplexer 33. The output of the multiplexer 33 serves as an output 34, on the one hand, and is connected to a further input of the multiplexer 33 via a delay device 35, on the other hand.

The hysteresis in the coefficient signal path ensures that small changes of the coefficients (caused by noise) are suppressed, whereas larger deviations (caused by motion) are essentially passed on.

Figure 5B:
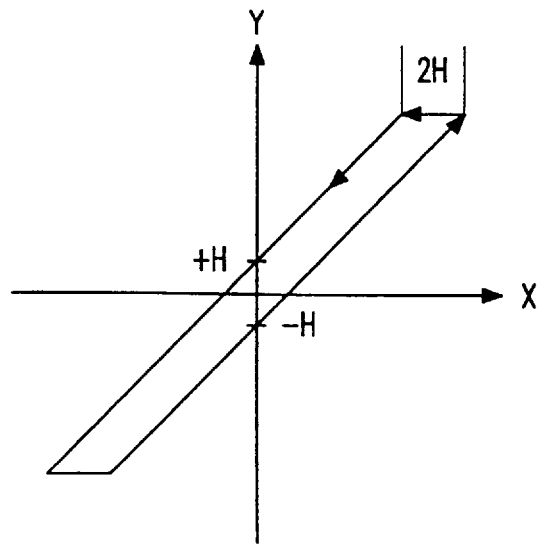
FIG. 5b shows a plot of the hysteresis characteristic.

The hysteresis characteristic shown in FIG. 5b has the following effect: the output signal Yn follows a rising input signal Xn with the function Y=X−H and a falling input signal with the function Y=X+H. In the transition range (from rising to falling, or conversely) the output signal remains constantly Yn=Yn−1 as long as the change of the input signal remains smaller than 2*H. The change of the input signal may be based on the preceding pixel, the preceding line or the preceding picture. Accordingly, the delay unit 35 in FIG. 5a may be implemented as a pixel, a line or a picture delay. For the circuit arrangement according to the invention, all of the three variants are principally suitable. A hysteresis with a picture delay is most suitable, preferably for suppressing noise components of a very low frequency.

Figure 6:
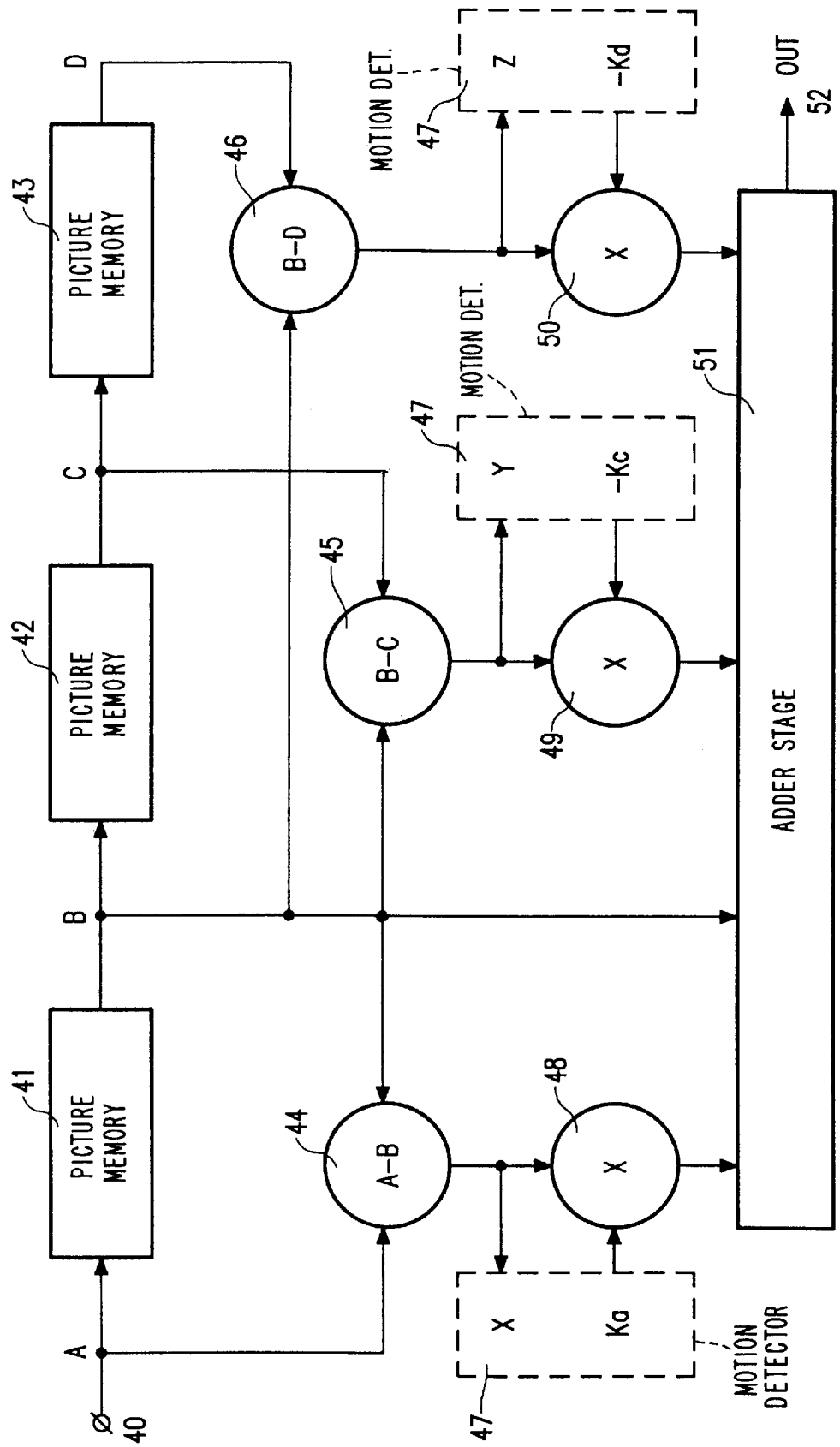
FIG. 6 is a block diagram of a third-order transversal filter according to the invention.

FIG. 6 shows a third-order transversal filter which receives the video signal via terminal 40. Three picture memories 41, 42, 43 are provided so that four consecutive pictures A, B, C, D are simultaneously available. In the differential stages 44, 45, 46, the difference video signals X=A−B, X=B−C and Z=B−D are derived from the video signals of the pictures A, B, C, D. These signals X, Y and Z are applied to the motion detector 47 shown in broken lines in FIG. 6, which motion detector is built up in the same way as in FIG. 2 and generates the coefficients Ka, Kc and Kd. The coefficients Ka, −Kc and −Kd are applied to the multiplier stages 48, 49, 50 for controlling the difference video signals. The video signals which are thus evaluated and can be derived at the outputs of the multiplier stages 48, 49, 50, and the (unevaluated) video signal of the reference picture B are finally applied to the inputs of an adder stage 51 having an output 52 at which the correspondingly filtered video signal can be derived.

Figure 7:
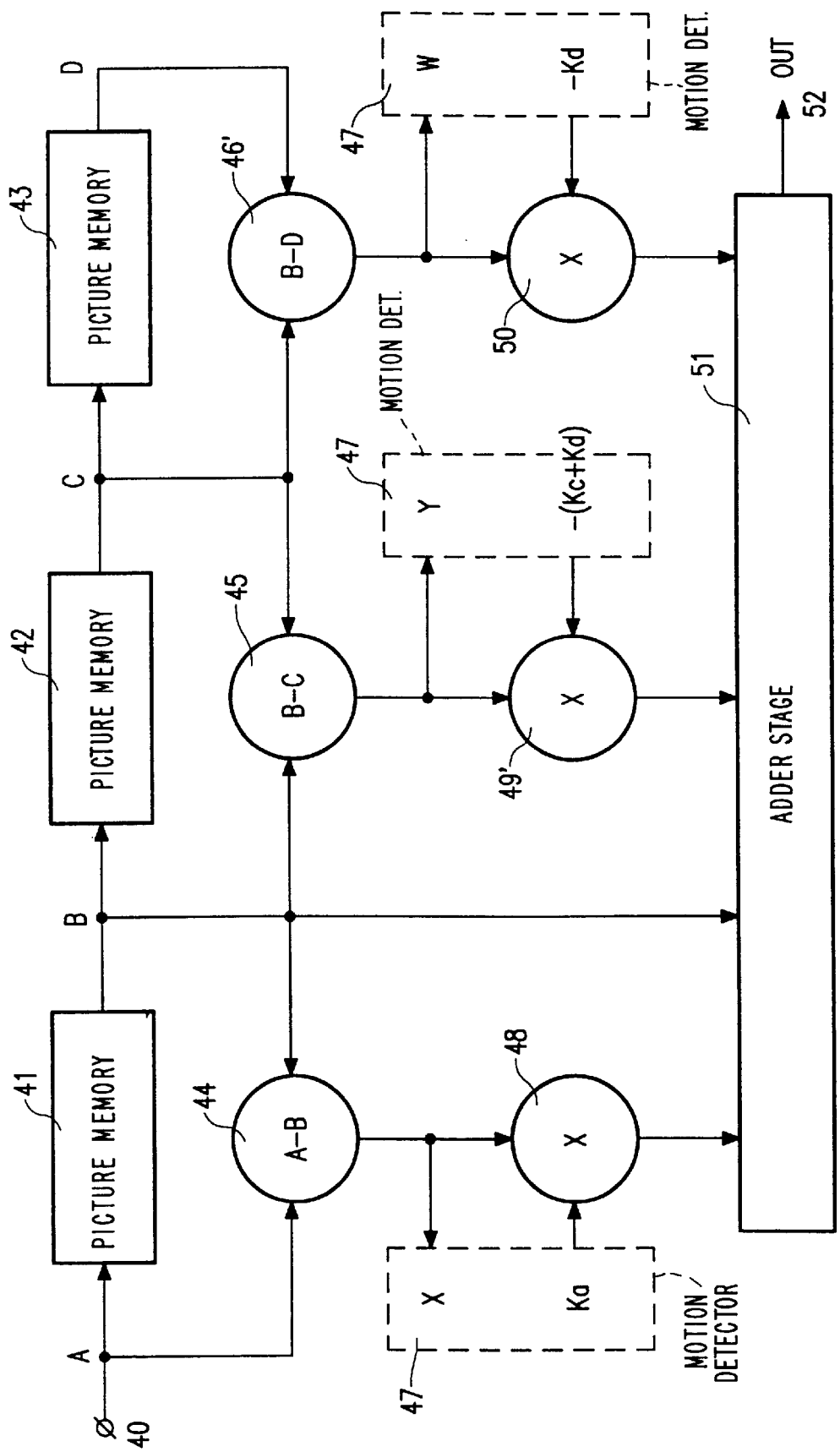
FIG. 7 is a block diagram of a further third-order transversal filter according to the invention.

FIG. 7 shows an alternative embodiment of the third-order transversal filter. As compared with the transversal filter shown in FIG. 6, the only difference is that the third reference signal is not based on the reference picture B, but is formed by the differential stage 46' with B=(C−D). The coefficient signal −(Kc+Kd) is thus present at the control input of the multiplier stage 49'.

In these third-order transversal filters, the difference signals X, Y and Z constitute motion vectors in a three-dimensional motion space. Here, too, the coefficients do not depend on the distance R to the origin, but only on the angle in the space. Thus, there is a transformation in spherical coordinates:

$$X = R*\COS \Phi*\COS \theta,\ Y = R*\SIN \Phi*\COS \theta,\ Z = R*\SIN \theta$$

The coefficients Ka, Kc and Kd thus depend on two variables only, the angles $\Phi$ and $\theta$.

I claim:

1. A method of eliminating interference signals from video signals by means of motion-adaptive filtering with a second or higher-order transversal filter which is controlled by a motion detector, said method comprising the steps:

generating a forward-motion signal and a backward motion signal from a video signal;

deriving coefficients from said forward-motion and backward-motion signals, respectively; and transversal filtering said video signal using said coefficients, characterized in that the method further comprises the step:

combining the generated forward-motion and backward-motion signals to form a common motion signal, and in that said step of deriving the coefficients for controlling the transversal filtering operation uses said common motion signal.

2. A method as claimed in claim 1, characterized in that said step of deriving the coefficients comprises:

transforming the common motion signal from cartesian coordinates into polar coordinates having an angle and a radius; and using said angle and radius to form the coefficients.

3. A method as claimed in claim 1, characterized in that said step of deriving the coefficients comprises:

transforming the common motion signal from cartesian coordinates into spherical coordinates having angles and a radius; and using said angles and radius to form the coefficients.

4. A method as claimed in claim 2, characterized in that the coefficients for controlling the transversal filtering operation are stored in a table, wherein said step of using said angle and said radius comprises addressing said table with the respective angle and the radius for obtaining the coefficients.

5. A method as claimed in claim 3, characterized in that the coefficients for controlling the transversal filtering operation are stored in a table, wherein said step of using said angles and radius comprises addressing said table with the respective angles and the radius.

6. A method as claimed in claim 2, characterized in that the coefficients for controlling the transversal filtering operation below a limit radius are constant and are not dependent on the angle.

7. A method as claimed in claim 2, characterized in that the coefficients for controlling the transversal filtering operation above a limit radius depend on the angle in accordance with the equations:

$$Kb = 1/(2 + \SIN 2\Phi)$$
$$Ka = 0.5 * (1 + \SIN 2\Phi - \COS 2\Phi)/(2 + \SIN 2\Phi)$$
$$Kc = 0.5 * (1 + \SIN 2\Phi + \COS 2\Phi)/(2 + \SIN 2\Phi),$$

where Kb, Ka and Kc are the coefficients, and $\Phi$ is the angle.

8. A method as claimed in claim 2, characterized in that the coefficients for controlling the transversal filtering operation above a limit radius depend on the angle in accordance with the equations:

$$Kb = \frac{1}{4}*(5+\SIN 2\Phi)/(2+\SIN 2\Phi)$$
$$Ka = \frac{1}{8}*(1+\SIN 2\Phi-\COS 2\Phi)/(2+\SIN 2\Phi)$$
$$Kc = \frac{1}{8}*(1+\SIN 2\Phi+\COS 2\Phi)/(2+\SIN 2\Phi),$$

where Kb, Ka and Kc are the coefficients, and $\Phi$ is the angle.

9. A method as claimed in claim 1, characterized in that said step of generating a forward-motion signal and a backward-motion signal from a video signal comprises:

deriving three time-sequential television pictures from said video signal; and subtracting one of said time-sequential television pictures from the other two time-sequential television pictures to form said forward-motion signal and said backward-motion signal, said combining step comprises coordinate transforming said forward-motion signal and said backward-motion signal from cartesian coordinates into polar coordinate signals representing an angle and a radius, and said step of deriving the coefficients comprises addressing a programmable read-only memory, containing a table of coefficient values, with said angle and radius, wherein the coefficients are supplied at outputs of said memory.

10. A method as claimed in claim 9, characterized in that said method further comprises low-pass filtering said forward-motion signal and said backward-motion signal prior to said combining step.

11. A method as claimed in claim 9, characterized in that said method further comprises low-pass filtering the output signals of the programmable read-only memory.

12. A method as claimed in claim 11, characterized in that said method further comprises the step performing a hysteresis operation on the output signals of the programmable read-only memory are first subjected to a hysteresis operation prior to said low-pass filtering step.

13. A method as claimed in claim 12, characterized in that the hysteresis operation is performed with a hysteresis characteristic having a horizontal, vertical or temporal effect.

14. A method as claimed in claim 9, characterized in that the programmable read-only memory has an adjustable limit radius below which the coefficients are constant, cut-off frequencies in the low-pass filtering step are adjustable, and the extent of the hysteresis operation is adjustable.

15. A method as claimed in claim 14, characterized in that the adjustments can be manually changed or readjusted by the user.

16. A method as claimed in claim 14, characterized in that the adjustments are automatically readjusted proportionally to the extent of noise.

17. An arrangement for eliminating interference signals from video signals by means of a second or higher-order transversal filter which is controlled by motion-dependent coefficients, characterized in that said arrangement comprises:

an input for receiving a digital video signal;

two series-arranged picture memories coupled to said input for each delaying the applied digital video signal by one picture period, three consecutive pictures thereby being simultaneously available at said input of said arrangement and at an output of each of said two series-arranged picture memories;

two differential stages having first inputs connected to the input of the arrangement and to the output of a first picture memory of said two series-arranged picture memories, respectively, and second inputs connected to the output of the first picture memory and to the output of a second picture memory of said two series-arranged picture memories, respectively, and outputs for supplying respective difference video signals derived from said three consecutive pictures;

a coordinate transformation device for converting the respective difference video signals from cartesian coordinates into polar coordinate signals; and a programmable read-only memory having coefficients for controlling the transversal filter stored in a table, said programmable read-only memory having inputs for receiving polar coordinate signals in the form of an angle and radius, said programmable read-only memory having outputs for supplying the coefficients stored in the table as addressed by said angle and radius.

18. An arrangement as claimed in claim 17, characterized in that said arrangement further comprises:

low-pass filters connected, respectively, to the outputs of the differential stages;

hysteresis devices connected, respectively, to the outputs of the memory; and further low-pass filters connected, respectively, to outputs of the hysteresis devices.

19. An arrangement as claimed in claim 18, characterized in that said arrangement further comprises an adjusting device for adjusting a limit radius in the programmable read-only memory, cut-off frequencies of the low-pass filters, and an extent of the hysteresis in the hysteresis devices.

* * * * *